(12) United States Patent
Wilson et al.

(10) Patent No.: US 7,124,997 B2
(45) Date of Patent: Oct. 24, 2006

(54) FLUSH VALVE ASSEMBLY WITH FLEX TUBE

(75) Inventors: John R. Wilson, Naperville, IL (US); Steven R. Oliver, Chicago, IL (US)

(73) Assignee: Sloan Valve Company, Franklin Park, IL (US)

( * ) Notice: Subject to any disclaimer, the term of this patent is extended or adjusted under 35 U.S.C. 154(b) by 396 days.

(21) Appl. No.: 10/252,242

(22) Filed: Sep. 23, 2002

(65) Prior Publication Data

US 2004/0056223 A1 Mar. 25, 2004

(51) Int. Cl.
*F16K 31/00* (2006.01)
(52) U.S. Cl. .......................... 251/42; 137/270
(58) Field of Classification Search ............... 251/42, 251/285; 137/270, 269
See application file for complete search history.

(56) References Cited

U.S. PATENT DOCUMENTS

| 784,408 | A | * | 3/1905 | Krichbaum | 137/489.5 |
| 3,367,621 | A | * | 2/1968 | Griswold | 251/35 |
| 3,397,863 | A | * | 8/1968 | Bell | 251/285 |
| 4,624,444 | A | * | 11/1986 | Johnson | 251/121 |
| 4,671,485 | A | * | 6/1987 | Saarem | 251/30.03 |
| 5,244,179 | A | * | 9/1993 | Wilson | 251/30.03 |
| 6,382,586 | B1 | * | 5/2002 | Wilson et al. | 251/40 |
| 6,460,825 | B1 | * | 10/2002 | Nortier et al. | 251/42 |

* cited by examiner

*Primary Examiner*—J. Casimer Jacyna
(74) *Attorney, Agent, or Firm*—Cook, Alex, McFarron, Manzo, Cummings & Mehler, Ltd.

(57) ABSTRACT

A toilet room flush valve includes a body with an inlet and an outlet and a valve seat therebetween. A valve assembly in the body is positioned to close upon the seat to control flow from the inlet to the outlet. A cover is mounted upon the body and defines a pressure chamber with the valve assembly. A bypass connects the inlet and the pressure chamber whereby pressure in the chamber maintains the valve assembly upon the seat. The pressure chamber may be vented to permit movement of the valve assembly toward the cover. The stroke of the valve assembly is limited by a volume regulator which is fixed to the cover and an adjustable microcontroller which is movable with the valve assembly and positioned to contact the volume regulator upon venting of the pressure chamber and consequent movement of the valve assembly.

12 Claims, 3 Drawing Sheets

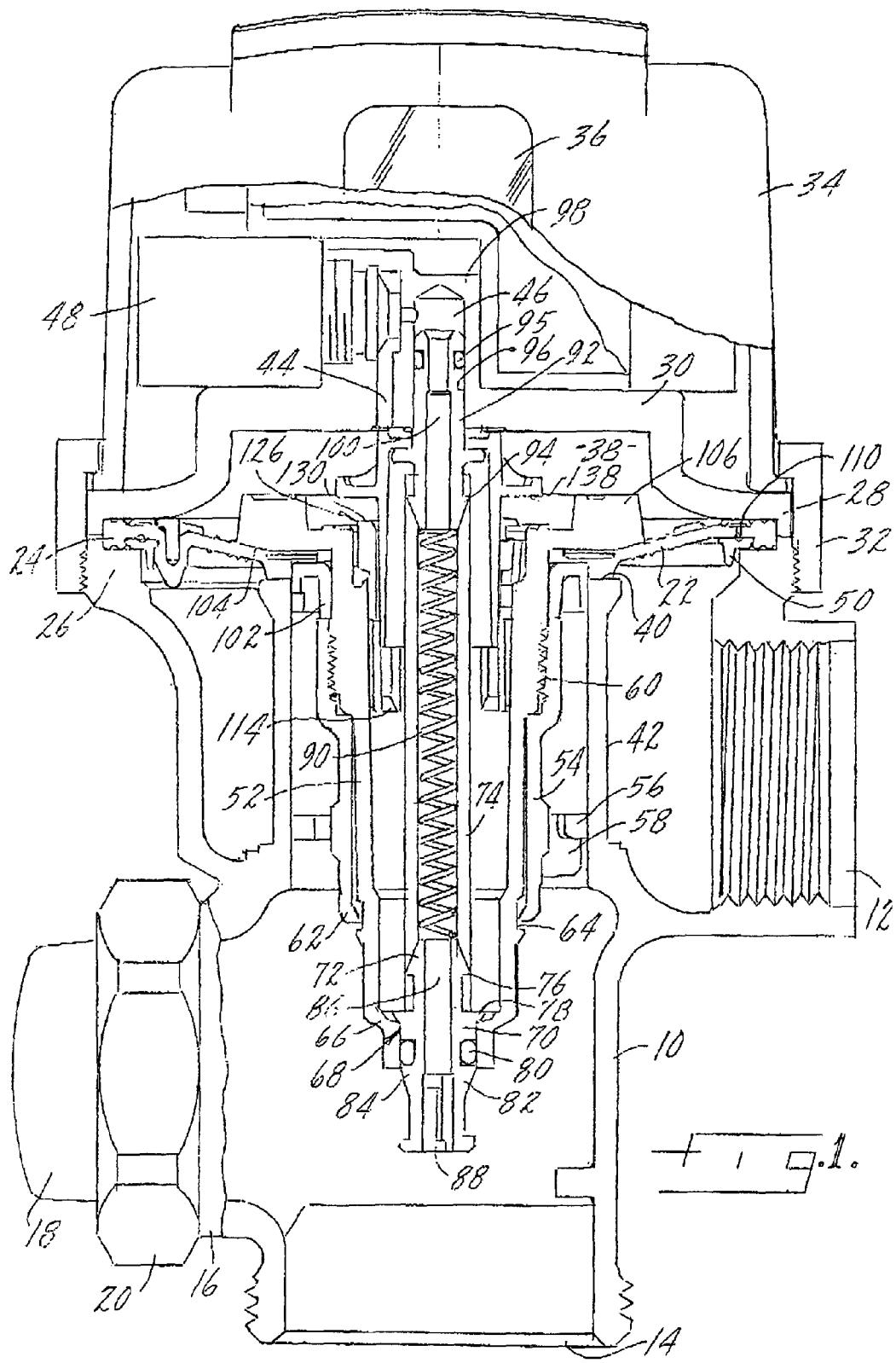

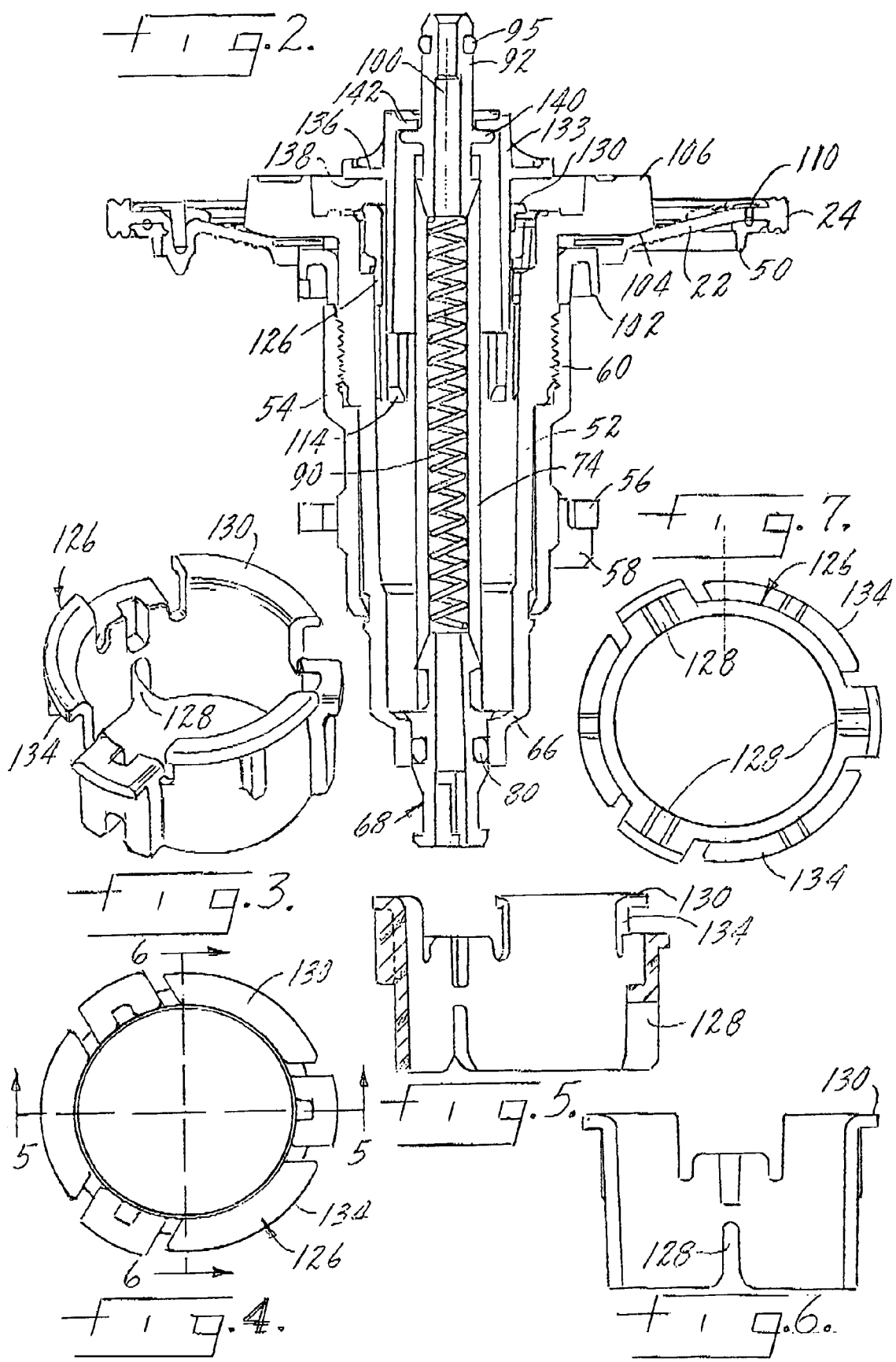

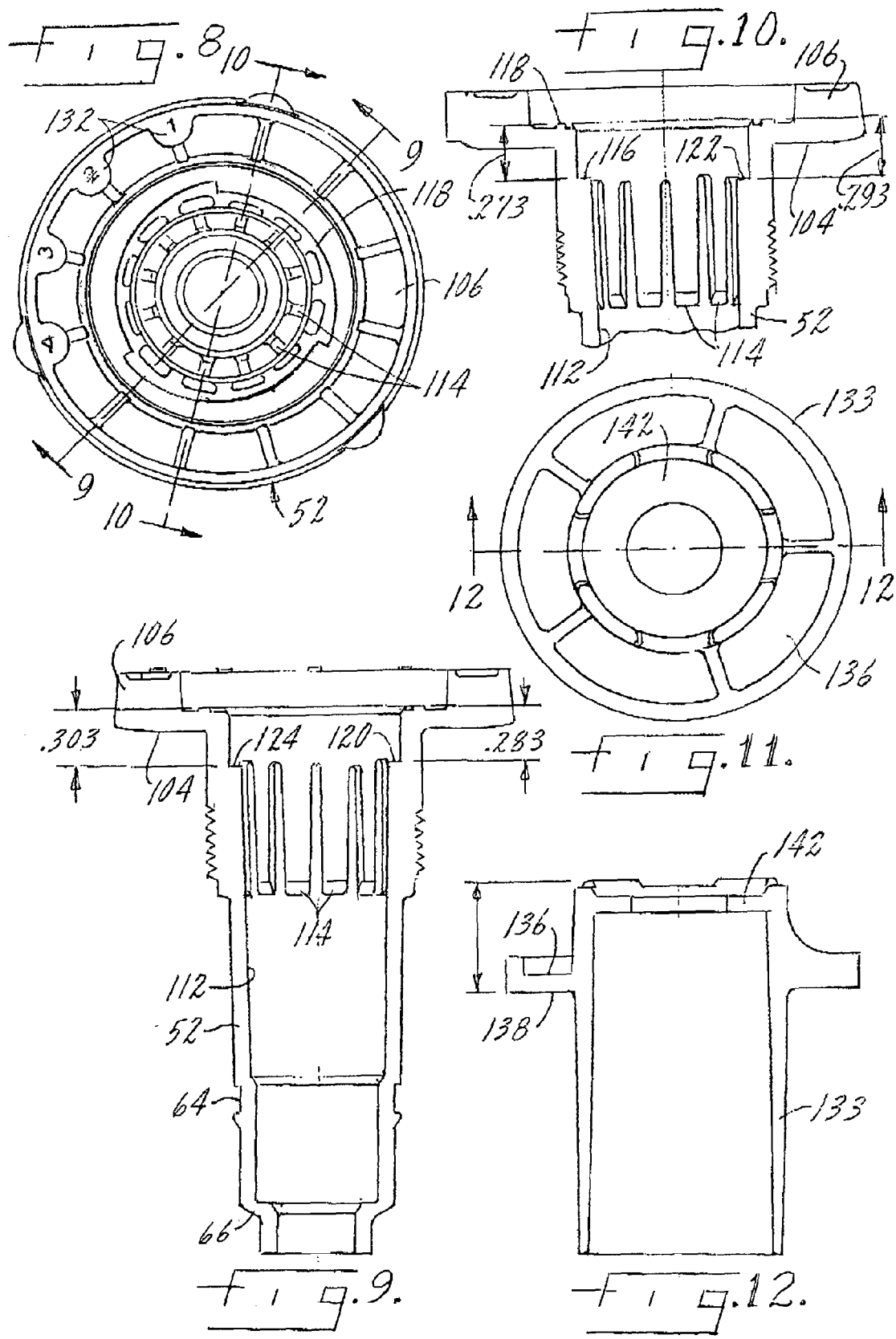

FLUSH VALVE ASSEMBLY WITH FLEX TUBE

THE FIELD OF THE INVENTION

The present invention relates to flush valves of the type generally shown in U.S. Pat. No. 6,382,586, owned by the assignee of the present application, Sloan Valve Company, of Franklin Park, Ill. More particularly, the present invention relates to an improvement upon the flush valve of the '179 patent in that it provides adjustment of the stroke of the valve assembly, both a fine adjustment and a coarse adjustment of the stroke, which allows the volume of water passing through the flush valve during operation to be controlled in discrete and predictable increments. Such adjustment permits the valve assembly to be converted to a specific application with a minimum number of parts and minimum education for the flush valve installer.

SUMMARY OF THE INVENTION

The present invention relates to toilet room flush valves and in particular to improvements in such valves to permit adjustment of the stroke of the valve assembly which controls the volume of water passing through the flush valve in a single operation.

A primary purpose of the invention is to provide a reliable and simply operable stroke adjustment for a diaphragm-type flush valve.

Another purpose of the invention is to provide stroke adjustment in a flush valve of the type described in which a single element may be rotated to several different positions, with each position providing a different stroke or degree of movement of the diaphragm assembly.

Another purpose of the invention is to provide a flush valve as described which has both a coarse and a fine stroke adjustment.

Another purpose of the invention is to provide stroke adjustment in a diaphragm-type flush valve using a microcontroller which may be moved to several different positions for fine adjustment and a volume regulator which may have variable sized flanges to provide a coarse adjustment for the diaphragm stroke.

Other purposes will appear in the ensuing specification, drawings and claims.

BRIEF DESCRIPTION OF THE DRAWINGS

The invention is illustrated diagrammatically in the following drawings wherein:

FIG. 1 is a front view, in part section, of a flush valve of the type disclosed herein;

FIG. 2 is a vertical section illustrating the valve assembly of the flush valve of FIG. 1;

FIG. 3 is a perspective of the microcontroller;

FIG. 4 is a top view of the microcontroller;

FIG. 5 is a section along plane 5—5 of FIG. 4;

FIG. 6 is a section along plane 6—6 of FIG. 4;

FIG. 7 is a bottom view of the microcontroller;

FIG. 8 is a top view of the disk;

FIG. 9 is a section along plane 9—9 of FIG. 8;

FIG. 10 is a section along plane 10—10 of FIG. 8;

FIG. 11 is a top view of the volume regulator; and

FIG. 12 is a section along plane 12—12 of FIG. 11.

DESCRIPTION OF THE PREFERRED EMBODIMENT

The present invention relates to an improvement in flush valves of the type shown in U.S. Pat. No. 6,382,586 and more specifically to a means for controlling the stroke of the valve assembly as it moves between open and closed positions. The disclosure of the '586 patent is herein incorporated by reference.

The stroke of the valve assembly, in the case shown herein, a diaphragm-type valve assembly, determines the volume of water delivered during a flushing cycle. Different types of toilet fixtures require different flushing volumes and the present invention provides both a coarse and fine adjustment of the diaphragm as it moves between open and closed positions. There is a microcontroller for fine adjustment of the stroke and there is a volume regulator for coarse adjustment. The components used herein to provide stroke adjustment may be made of a suitable plastic, eliminating potential corrosion, and may be easily adjusted with a minimum of parts and with a minor degree of education by the individual installing the flush valve. The stroke adjustment and the parts used therefor allow the flush valve to have precisely controlled and predictable volumes of water passing through the valve during the flushing cycle and enable the flush valve to be used in many different environments and with different types of toilet fixtures.

The invention will be described in connection with a battery-operated solenoid flush valve of the type sold by Sloan Valve Company of Franklin Park, Ill., under the trademark OPTIMA. The invention has wider application and is usable in any flush valve in which a pressure chamber is vented through a pilot valve mechanism and the primary flow control assembly moves off of its seat to control flow through the flush valve.

In FIG. 1, the flush valve body is indicated at 10 and may have an inlet opening 12 and an outlet opening 14. There is a boss 16 at the left side of the outlet 14 and this normally is the location of the flush valve manual handle. However, in the present instance, a cap 18 may close this opening and may be held in position by a lock ring 20. The valve shown is of the type sold by Sloan Valve Company under the trademark ROYAL and thus uses the diaphragm to control flow between the inlet and the outlet. The diaphragm is indicated at 22 and is held at its periphery 24 on a shoulder 26 of the body 10 by a flange 28 of an inner cover 30. A threaded lock ring 32 holds the above-described assembly and an outer cover 34 which will contain the solenoid, an infrared sensor, and the associated battery and electronics to operate the sensor. The sensor window is indicated at 36 in FIG. 1. The above-referenced '586 patent shows these elements in greater detail.

The area between the underside of the cover 30 and the upper side of the diaphragm 22 forms a pressure chamber 38. The pressure of the water within this chamber holds the diaphragm 22 upon a seat 40 formed at the upper end of the barrel 42 which forms a conduit between the inlet 12 and the outlet 14.

There is a vent passage 44 in the upper cover which connects to pressure chamber 38 and a chamber 46 in the upper cover, with the flow of water between the vent passage 44 and the chamber 46 being controlled by a solenoid 48. Details of this operation are disclosed in the above-referenced '586 patent, as well as in U.S. Pat. Nos. 4,309,781 and 4,793,588.

Water flow through the inlet 12 reaches the pressure chamber 38 through a filter and bypass ring 50, the details of which are disclosed in U.S. Pat. No. 5,967,182. Thus, water from the flush valve inlet reaches the pressure chamber 38, to maintain the diaphragm in a closed position, and the pressure chamber will be vented by the operation of the solenoid as water will flow upwardly through passage 44, then into chamber 46, and then through the passage in the flex tube to be described hereinafter.

The diaphragm assembly includes the diaphragm which, in its closed position, will rest upon the seat 40 and a disk 52. The disk 52 is threadedly attached to a guide 54 which carries a flow control ring 56 which is adjacent the interior of the barrel 42. Directly below the flow control ring 56, the guide includes arcuate projections 58 which support ring 56. In addition to the threaded connection 60 between the guide 54 and the disk 52, the guide carries pairs of inwardly-directed barbs 62, annular in form, which extend within a recess 64 in the exterior of the disk to lock these elements in an assembled and fixed position. At the lower end of guide 54 there is an inwardly-directed shoulder 66, which functions to support a lower flex tube adapter 68, illustrated in more detail in the above-reference '586 patent. The adapter 68 includes a body 70 and an upwardly-directed nose 72 which will extend into and secure the lower end of a flex tube 74. The nose 72 has a barb 76 which deforms the flex tube and functions to positively hold the lower end of the flex tube to the adapter. The body 70 includes an outwardly-directed flange 78, which rests upon the inwardly-directed shoulder 66 of the guide and there is a seal ring 80 which is located within an outwardly-facing groove in the adapter and bears against the interior of the guide.

A portion 82 of the adapter 68 extends outwardly from the guide and has a shoulder 84 to effectively hold the adapter 68 to the lower end of the guide, with only minimal movement permitted. The adapter 68 has a central water passage 86 which communicates with a central passage 88 in the portion 82 of the adapter. Thus, any water flowing down through the flex tube 74 will pass out of the adapter and be directed toward the flush valve outlet 14.

The flex tube 74 which is hollow and in the form of a flexible sleeve, contains a coil spring 90, which prevents the tube from collapsing due to water pressure flowing downwardly through the disk 52. At its upper end, the flex tube is attached to an inner cover adapter 92. The adapter 92 may have one or more outwardly-extending projections 94 which interact with and may deform the interior of the flex tube wall to secure the adapter in position. The upper nose of the adapter 92 is tapered and has an O-ring 95 which forms a seal with an interior wall 96 in an extension 98 of the cover 30. The adapter 92 thus extends within the chamber 46 and forms part of the fluid connection from the chamber 46, down through the interior passage 100 of the adapter, and into the interior of the flex tube 74 through which water flows, from the pressure chamber 38 to the flush valve outlet 14.

Seated on top of the upper end of the guide 54 is a refill head 102, with the diaphragm 22 being captured between the upper surface of the refill head and a lower surface 104 of a radially outwardly-extending portion 106 of the disk 52. The diaphragm, disk 52 and guide 54 will all move together when pressure is relieved in chamber 38 and the diaphragm moves upwardly to provide a direct connection between the flush valve inlet 12 and flush valve outlet 14. When this takes place, the disk 52 will move up and will carry with it the lower end of the flex tube 74. Thus, the flex tube must bend as its upper end is fixed within the passage 96 of the cover 30.

The upward movement of the diaphragm, or the stroke of the valve assembly, controls the amount of water passing through the flush valve during operation. Water flows into the pressure chamber 38 through a bypass orifice 110 which is in communication with the flush valve inlet 12. The length of time in which it takes for the pressure chamber 38 to fill, forcing the diaphragm back upon its seat 40, determines the volume of water that will flow through the flush valve. The distance the diaphragm moves upwardly off its seat, the stroke of the valve assembly, is adjustable and is determined by a microcontroller and a volume regulator. The microcontroller is indicated in FIGS. 3–7 and its relationship with the guide 52 is illustrated in FIGS. 8, 9 and 10. FIGS. 11 and 12 illustrate the volume regulator.

The inside cylindrical surface 112 of the disk 52 contains a plurality, in this case twelve, downwardly-extending ribs 114. The ribs are arranged in three groups of four. Within each group of four the ribs vary in position at their upper end, as illustrated by the dimension in FIGS. 9 and 10. For example, and only for purposes of explanation, the distance from the top of a rib 116 to the upper surface of an annular rim 118 may be 0.273 in. The distance between a rib 120 shown in FIG. 9 to the top of the rim 118 may be 0.283 in. The distance from the top of a rib 122 to the rim 118 may be 0.293 in and finally, the distance from the top of a rib 124 to the rim 118 may be 0.303 in. There are thus three ribs of equal height, one within each of the three groups. The microcontroller, indicated at 126, has three equally spaced downwardly-facing slots 128. When the microcontroller is inserted within the disk 52, each of the slots 128 will interact with a rib in one of the three sets. The end result of this cooperating relationship is that the upper surface 130 of the microcontroller may be located at four different heights. As particularly shown in FIG. 8, there are indicia tabs 132, with the numbers 1, 2, 3 and 4 to designate how the microcontroller may be positioned relative to the disk 52 in order to establish the four different heights for the upper surface 130 of the microcontroller.

The microcontroller is inserted within the disk 52 at one of the four designated positions. Or the microcontroller may be left out entirely, which would establish a fifth fine adjustment height for controlling the stroke of the diaphragm assembly. The microcontroller will be snapped in, either during assembly of the valve at the factory, or by the installer, depending upon the particular type of fixture with which the flush valve will be used. The installer will determine the position of the microcontroller, depending upon the volume of water which is to pass through the flush valve during operation of a particular fixture. The microcontroller has a plurality of tabs 134 which provide a degree of flexibility, allowing the microcontroller to be inserted within the guide, but easily removable. The tabs 134 provide the upper surface 130 which will function as a stop with the volume regulator, as described hereinafter.

The volume regulator, shown in FIGS. 11 and 12, is indicated at 133 and has an outwardly-extending annular shoulder 136, the lower surface 138 of which functions as the stop limiting upward movement of the diaphragm assembly and the microcontroller. The surface 130 will contact the surface 138 and the distance through which the surface 130 moves before such contact determines the stroke of the flush valve. The microcontroller provides a fine stroke adjustment and the height of the shoulder 136, the lower surface of which functions as a stop may provide a coarse adjustment of stroke. Different volume regulators may be utilized, each of which may have a different height for the shoulder 136, with the height of the shoulder determining the location of the surface 138 which in turn limits the upward movement of the diaphragm assembly.

The volume regulator will be attached to the inner cover adapter 92 by means of an outwardly-extending shoulder 140 on the adapter and an inwardly-extending flange 142 on the volume regulator. This is particularly shown in FIG. 2. Thus, the volume regulator is attached to the inner cover adapter 92, which in turn is fixed in position relative to the inner cover 30. Since the volume regulator is fixed in position relative to the inner cover, the upper stop formed by the shoulder 136 will also be fixed. The distance the valve assembly or the diaphragm may move, or its stroke, is determined by the space between the surface 130 and the underside 138 of the volume regulator. Coarse adjustment is provided by the height of the shoulder 136. Fine adjustment is provided by the position of the microcontroller within the disk 52 and as described, there may be four such positions of the disk, each one providing a different location for the upper surface 130. The fifth location of adjustment is provided by removal of the microcontroller, in which case the shoulder 136 will be contacted by the rim 118 as the diaphragm assembly moves upwardly. This provides the greatest stroke of the flush valve.

The stroke control described accurately controls the volume of water which is delivered during a single flushing cycle. The volume regulator provides coarse adjustment and the microcontroller provides fine adjustment. Both the microcontroller and the volume regulator may be made from a suitable plastic and the use of the microcontroller, or its non-use, provides five fine levels of stroke adjustment. The thickness of the flange and the volume regulator, and there may be several such volume regulators, provides coarse adjustment. Thus, one single flush valve, with a minimum of interchange of parts and arrangement of parts, may provide a substantial number of discrete, predictable flush valve volumes.

Whereas the preferred form of the invention has been shown and described herein, it should be realized that there may be many modifications, substitutions and alterations thereto.

The invention claimed is:

1. A toilet room flush valve including a body having an inlet and an outlet, a valve seat between said inlet and outlet, a valve assembly in said body positioned to close upon said seat to control flow from said inlet to said outlet, a cover mounted upon said body and defining a pressure chamber with said valve assembly, bypass means connecting said inlet and pressure chamber whereby the pressure in said chamber maintains said valve assembly upon said seat, means for venting said pressure chamber permitting movement of said valve assembly toward said cover, means for limiting the stroke of said valve assembly as it moves toward said cover including a stop fixed relative to said cover, and an adjustable microcontroller movable with said valve assembly and positioned to contact said stop upon venting of said pressure chamber and consequent movement of said valve assembly.

2. The flush valve of claim 1 wherein said microcontroller is attached to said valve assembly and has an upper surface thereof positioned to contact a facing surface of said stop.

3. The flush valve of claim 1 wherein said microcontroller and valve assembly have cooperating means thereon to provide a plurality of adjustable positions of said microcontroller upper surface to vary the stroke of said valve assembly.

4. The flush valve of claim 3 wherein said cooperating means includes variable height projections on said valve assembly and corresponding slots on said microcontroller.

5. The flush valve of claim 4 wherein there are a plurality of groups of projections on said valve assembly, there being the same number of projections in each group, with there being projections of equal height in each of the groups, and wherein the number of slots on said microcontroller is the same as the number of groups of projections on said valve assembly.

6. The flush valve of claim 5 wherein said valve assembly carries indicia thereon indicating the number of projection groups and the relative position of each of the different height projections so as to provide a guide for locating of said microcontroller.

7. The flush valve of claim 5 wherein said projections are vertically extending ribs, and said slots and said microcontroller extend in a vertical direction.

8. The flush valve of claim 5 wherein there are three groups of projections, with four projections in each group providing four adjustable positions of said microcontroller.

9. The flush valve of claim 8 wherein removal of said microcontroller provides a fifth level of adjustment in that an upper surface of said valve assembly is thereby positioned to contact said stop.

10. The flush valve of claim 1 wherein said valve assembly a flexible diaphragm.

11. The flush valve of claim 2 wherein said stop is a volume regulator in which said facing surface includes an outwardly extending annular flange.

12. The flush valve of claim 11 wherein said annular flange has a variable thickness to provide different positions of said facing surface relative to the upper surface of said volume regulator.

* * * * *

UNITED STATES PATENT AND TRADEMARK OFFICE
CERTIFICATE OF CORRECTION

PATENT NO. : 7,124,997 B2 Page 1 of 1
APPLICATION NO. : 10/252242
DATED : October 24, 2006
INVENTOR(S) : Wilson et al.

It is certified that error appears in the above-identified patent and that said Letters Patent is hereby corrected as shown below:

On the title page,

[*] Notice: Subject to any disclaimer, the term of this patent is extended or adjusted under 35 USC 154(b) by (396) days Delete the phrase "by 396 days" and insert -- by 19 days--

Signed and Sealed this

Fifth Day of June, 2007

JON W. DUDAS
*Director of the United States Patent and Trademark Office*